(12) United States Patent
Ahmed et al.

(10) Patent No.: US 7,691,521 B2
(45) Date of Patent: Apr. 6, 2010

(54) SOLID OXIDE FUEL CELL

(75) Inventors: Khaliq Ahmed, Rowville (AU); Dean Andrew Goble, Chadstone (AU)

(73) Assignee: Ceramic Fuel Cells Limited, Victoria (AU)

( * ) Notice: Subject to any disclaimer, the term of this patent is extended or adjusted under 35 U.S.C. 154(b) by 1491 days.

(21) Appl. No.: 10/506,323

(22) PCT Filed: Mar. 3, 2003

(86) PCT No.: PCT/AU03/00264

§ 371 (c)(1), (2), (4) Date: Oct. 29, 2004

(87) PCT Pub. No.: WO03/075388

PCT Pub. Date: Sep. 12, 2003

(65) Prior Publication Data

US 2005/0153178 A1    Jul. 14, 2005

(30) Foreign Application Priority Data

Mar. 4, 2002    (AU) ..................... PS0875

(51) Int. Cl.
H01M 4/86 (2006.01)
H01M 4/90 (2006.01)
H01M 8/06 (2006.01)
H01M 8/12 (2006.01)

(52) U.S. Cl. .............. 429/40; 429/30; 429/44; 429/45

(58) Field of Classification Search ........... None
See application file for complete search history.

(56) References Cited

U.S. PATENT DOCUMENTS

2003/0077504 A1    4/2003    Hara et al.

FOREIGN PATENT DOCUMENTS

| EP | 1 306 920 A2 | 5/2003 |
|---|---|---|
| JP | 4-121964 A | 4/1992 |
| JP | 4-160760 A | 6/1992 |
| JP | 5-62701 A | 3/1993 |
| JP | 5-67472 A | 3/1993 |
| JP | 9-73913 A | 3/1997 |
| JP | 2003-132906 A | 5/2003 |
| WO | WO-0029092 A1 | 5/2000 |
| WO | WO-01/13452 A1 | 2/2001 |

OTHER PUBLICATIONS

Machine translation of JP 09-073913, Mar. 1997.*
Machine translation of JP 05-067472, Mar. 1993.*
Derwent Abstract Accession No. 93-209780/26, JP 05-135794 (Chubu Electric Power Co. Inc. et al) Jun. 1, 1993 abstract.
Derwent Abstract Accession No. 96-502427/50, JP-08-259201 (NGK Insulators Ltd.) Oct. 8, 1996.
Japanese Examination Report dated Sep. 1, 2009, issued in corresponding Japanese Application No. 2003-573729.

* cited by examiner

*Primary Examiner*—Jonathan Crepeau
(74) *Attorney, Agent, or Firm*—Birch, Stewart, Kolasch, & Birch LLP

(57) ABSTRACT

A solid oxide fuel cell comprising a solid oxide electrolyte layer, a cathode layer on a cathode side of the electrolyte layer and an anode layer on an anode side of the electrolyte layer, and wherein a hydrocarbon reforming layer is also disposed on the anode side of the electrolyte layer, said hydrocarbon reforming layer having a composition different from that of the anode layer and comprising a catalyst for promoting a hydrocarbon steam reforming reaction and a component, or a precursor of such a component for alleviating carbon deposition on the hydrocarbon reforming layer.

14 Claims, No Drawings

SOLID OXIDE FUEL CELL

TECHNICAL FIELD

The present invention relates to solid oxide fuel cells and is particularly concerned with steam reforming a hydrocarbon fuel supply to a solid oxide fuel cell.

BACKGROUND ART

Fuel cells convert gaseous fuels (such as hydrogen, natural gas and gasified coal) via an electrochemical process directly into electricity. A fuel cell continuously produces power when supplied with fuel and oxidant, normally air. A typical fuel cell consists of an electrolyte (ionic conductor, $H^+$, $O^{2-}$, $CO_3^{2-}$, etc.) in contact with two electrodes (mainly electronic conductors). On shorting the cell through an external load, fuel oxidises at the anode resulting in the release of electrons which flow through the external load and reduce oxygen at the cathode. The charge flow in the external circuit is balanced by ionic current flows within the electrolyte. Thus, at the cathode oxygen from the air or other oxidant is dissociated and converted to oxygen ions which migrate through the electrolyte membrane and react with the fuel at the anode/electrolyte interface. The voltage from a single cell under load conditions is in the vicinity of 0.6 to 1.0 V DC and current densities in the range 100 to 1000 $mAcm^{-2}$ can be achieved.

Several different types of fuel cells have been proposed. Amongst these, the solid oxide fuel cell (SOFC) is regarded as the most efficient and versatile power generation system, in particular for dispersed power generation, with low pollution, high efficiency, high power density and fuel flexibility. SOFC's operate at elevated temperatures, for example 700-1000° C.

Numerous SOFC configurations are under development, including the tubular, the monolithic and the planar design. The planar or flat plate design is the most widely investigated. Single planar SOFCs are connected via interconnects or gas separators to form multi-cell units, sometimes termed fuel cell stacks. Gas flow paths are provided between the gas separators and respective electrodes, for example by providing gas flow channels in the gas separators. In a fuel cell stack the components—electrolyte/electrode laminates and gas separator plates—are fabricated individually and then stacked together. With this arrangement, external and internal co-flow, counter-flow and cross-flow manifolding options are possible for the gaseous fuel and oxidant.

Traditionally hydrogen, usually moistened with steam, has been used as a fuel cell fuel. However, in order to be economically viable the fuel must be as cheap as possible. One relatively cheap source of hydrogen is natural gas, primarily methane with a small proportion of heavy hydrocarbons ($C_{2+}$). Natural gas is commonly converted to hydrogen in a steam reforming reaction, but the reaction is endothermic and, because of the stability of methane, requires a reforming temperature of at least about 650° C. for substantial conversion and a higher temperature for complete conversion.

One proposal for a fuel cell electricity generation process in which a hydrocarbon fuel is converted to a fuel cell fuel stream including hydrogen in a steam pre-reformer is disclosed in EP-A-0435724. The temperature in the pre-reformer is described as 700 to 850° C. with a resultant product-gas composition of 65-80 vol % $H_2$, 5-20 vol % CO, and 5-25 vol % $CO_2$.

Another such proposal is disclosed in U.S. Pat. No. 5,302,470 in which the steam pre-reforming reaction is said to be carried out under similar conditions to those of known steam reforming reactions: for example, an inlet temperature of about 450 to 650° C., an outlet temperature of about 650 to 900° C., and a pressure of about 0 to 10 $kg/cm^2$.G to produce a fuel cell fuel stream which is composed mainly of hydrogen and is fed to the fuel cell anode via a carbon monoxide shift converter.

Hydrocarbon fuels suggested for use in the above two proposals include, in addition to natural gas, methanol, kerosene, naphtha, LPG and town gas.

While high temperature fuel cell systems produce heat which must be removed, heat exchangers capable of transferring thermal energy at the required level from the fuel cells to a steam reformer are expensive. Thus, hydrogen produced by steam reforming natural gas may not be a cheap source of fuel.

It has been proposed to alleviate the problem of the cost of substantially complete steam pre-reforming of methane by using natural gas as a fuel source for a high temperature planar fuel cell stack and subjecting the natural gas to steam reforming within the stack, at a temperature of at least about 650° C., using catalytically active anodes. However, this arrangement can lead to carbon deposition problems on the anode from $C_{2+}$ hydrocarbons, and is not suited to other higher hydrocarbon fuels for this reason. Furthermore, given the endothermic nature of the methane steam reforming reaction, too much methane in the fuel stream can lead to excessive cooling of the fuel cell stack. To alleviate this problem the fuel stream has been restricted to a maximum of about 25% methane (on a wet basis) with the natural gas being subjected to partial steam pre-reforming at elevated temperatures approaching 700° C. upstream of the fuel cell stack.

Another process for producing electricity in a fuel cell from hydrocarbon fuels such as gasified coal, natural gas, propane, naphtha or other light hydrocarbons, kerosene, diesel or fuel oil is disclosed in EP-A-0673074. As described in that specification, the process involves steam pre-reforming approximately 5 to 20% of the hydrocarbon fuel at a temperature of at least 500° C. after start-up to convert ethane and higher hydrocarbons in that fraction to methane, hydrogen and oxides of carbon and to achieve a measure of methane pre-reforming in that fraction to oxides of carbon and hydrogen. Steam pre-reforming at this lower temperature alleviates carbon deposition in the pre-reformer. The hydrocarbon fuel with the steam pre-reformed fraction is then supplied to fuel inlet passages of the fuel cell stack which are coated with or contain a catalyst for steam reforming of the methane and remaining hydrocarbon fuel at 700-800° C. into hydrogen and oxides of carbon which are supplied to the anodes in the fuel cell stack.

Indirect internal steam reforming of the remaining hydrocarbon fuel within the fuel inlet passages in EP-A-0673074 is said to allow the use of reforming catalysts within the fuel inlet passages which are less likely to produce coking or carbon deposits from the internal steam reforming of the higher hydrocarbons than the nickel cermet traditionally used in anodes for solid oxide fuel cells. It is believed that steam pre-reforming of the hydrocarbon fuel in the described temperature range is restricted to 5 to 20% of the fuel in order to relatively increase the level of hydrogen in the fuel stream to the fuel cell stack and thereby alleviate carbon deposition when the fuel is internally reformed in the stack.

One of the advantages of reforming a hydrocarbon fuel stream including methane on a solid oxide fuel cell anode is the potential ability to thermally manage the fuel cell by appropriately balancing the exothermic fuel cell reaction resulting in the production of electricity with the endothermic methane steam reforming reaction. For optimum thermal management, the steam reforming reaction should occur immediately adjacent the fuel cell reaction so that the heat produced by the fuel cell reaction can be directly taken up by the steam reforming reaction. Although EP-A-0673074 describes the reforming catalyst as being in intimate thermal contact with the fuel cells, the contact in fact is by way of heat transfer through the tubes defining the passages in which the catalyst is disposed and further by way of a porous ceramic support, which would tend to hinder thermal management.

An alternative approach to providing a fuel stream for a fuel cell in which the proportion of methane derived from a higher carbon ($C_{2+}$) hydrocarbon fuel is increased is disclosed in our International Patent Application No. WO 01/12452. In this proposal all the fuel is reacted with steam in a steam pre-reformer at a temperature in the pre-reformer of no greater than 500° C. to produce a fuel stream including hydrogen and no less than about 20% by volume methane (measured on a wet basis), with minimal, if any, $C_{2+}$ hydrocarbons. The fuel stream is reacted at the anode of the fuel cell to steam reform the methane and to produce electricity when an oxidant such as air is reacted at the fuel cell cathode. A modification of this proposal is described in our International patent application PCT/AU02/00128.

In both these proposals, the proportion of methane in the fuel stream to a high temperature fuel cell in which the methane is internally reformed directly on the anode is increased, giving the potential for better thermal management of the fuel cell for the reasons described above. Any excessive cooling of the fuel cell due to the relatively high levels of methane being reformed can be resolved as described in WO 01/12452 and AU PR 3242. Carbon deposition resulting from steam reforming on the anode is alleviated by minimizing the proportion of $C_{2+}$ hydrocarbons in the fuel stream contacting the anode. However, the risk of carbon deposition from methane in the fuel stream still remains.

Therefore, although the proposals in WO 01/12452 and PR 3242 do alleviate carbon deposition on the anode of a solid oxide fuel cell, it would be advantageous to further reduce the risk of carbon deposition from methane on the anode while maintaining the potential for good thermal management.

SUMMARY OF THE INVENTION

According to the present invention there is provided a solid oxide fuel cell comprising a solid oxide electrolyte layer, a cathode layer on a cathode side of the electrolyte layer and an anode layer on an anode side of the electrolyte layer, and wherein a hydrocarbon reforming layer is also disposed on the anode side of the electrolyte layer, said hydrocarbon reforming layer having a composition different from that of the anode layer and comprising a catalyst for promoting a hydrocarbon steam reforming reaction and a component, or a precursor of such a component, for alleviating carbon deposition on the hydrocarbon reforming layer.

By the present invention the functions of catalyzing the hydrocarbon steam reforming reaction and performing the electrochemical reaction on the anode are separated into two layers on the anode side of the electrolyte layer. The potential for good thermal management is achieved by providing both the anode layer and the hydrocarbon reforming layer on the electrolyte, and the performance of the fuel cell is enhanced by including in the hydrocarbon reforming layer a component, or a precursor of such a component, for alleviating carbon deposition on the hydrocarbon reforming layer.

One of the disadvantages of performing the hydrocarbon steam reforming reaction on the anode of the fuel cell, as proposed in the prior art, is the different microstructure requirements for the steam reforming reaction and the electrochemical anode reaction. The anode must be porous in order to permit the fuel gas to reach the anode-electrolyte interface and to permit the product gases to be removed. However, the porosity at the interface is preferably relatively small in order to increase the triple phase boundary length, and therefore the surface area available for the electrochemical reaction. On the other hand, steam reforming is preferably performed on a material of a different microstructure in order to permit the fuel stream mixture to reach the catalytically active sites (for reforming) of the material. A substantial advantage of separating the hydrocarbon reforming layer and the anode layer is being able to provide the desired microstructure for each.

The hydrocarbon reforming layer may overlie the anode layer so as to at least partially cover the anode layer, or it may be provided as a separate layer on the anode side of the electrolyte, in one or more parts. Preferably, the hydrocarbon reforming layer entirely covers the anode layer, but if any of the anode layer is exposed, the hydrocarbon reforming layer is advantageously upstream of the anode layer, relative to the fuel stream flow to the fuel cell, so as to ensure that substantially all of the hydrocarbons in the fuel stream are steam reformed before the fuel stream contacts the anode layer. In solid oxide and molten carbonate fuel cells the fuel stream to the anode is normally methane only, but may contain trace amounts of $C^{2+}$ higher hydrocarbons. Depending upon the operating conditions of the fuel cell a small proportion, for example, less than 15% by volume and preferably less than 10% by volume, of methane and any trace amounts of higher hydrocarbons in the fuel stream which contacts the anode may be tolerated without significant carbon deposition problems. Preferably, essentially all (such as at least 98% by volume) of the hydrocarbons in the fuel stream will be converted by the hydrocarbon reforming layer for maximum power and thermal balance.

Two-layer anodes for fuel cells have previously been proposed, but these are of the same material, a nickel cermet, with the overlying layer being a coarse current collection layer. Although the current collection layer is not designed to perform steam reforming of a hydrocarbon fuel stream, the nickel in the layer would catalyze such a reaction until the current collection layer became coked up due to deposition of carbon.

Steam reforming of methane proceeds according to the reaction:

$$CH_4+H_2O=CO+3H_2 \qquad (1)$$

and is accompanied by the water-gas shift reaction:

$$CO+H_2O=CO_2+H_2 \qquad (2)$$

However, the undesirable reactions (3,4) of carbon formation can occur if the reforming material is not designed to retard the kinetics of these reactions or to promote the carbon gasification reaction (5):

$$CH_4=C+2H_2 \qquad (3)$$

$$2CO=C+CO_2 \qquad (4)$$

$$C+H_2O=CO+H_2 \qquad (5)$$

The component for alleviating carbon deposition on the hydrocarbon reforming layer may be any material that decreases the rate and degree of methane dissociation by retarding the carbon formation reaction (3) and/or promotes the carbon gassification reaction (5) by enhancing the adsorption/dissociation of steam by the water-gas shift reaction (2)

and/or by any one or more of the steam reforming reaction components (i), (ii) and (iii), where "sup" is the catalyst support material $$H_2O + *sup = H_2O*sup \quad (i)$$

$$H_2O*sup + *sup = OH*sup + H*sup \quad (ii)$$

$$OH*sup + *catalyst = OH*catalyst + *sup \quad (iii)$$

Such materials include rare earth materials such as cerium oxide, praseodymium oxide, lanthanum oxide, samarium oxide, tungsten oxide, molybdenum oxide, alkaline earth based materials such as magnesium oxide, and alkali based materials such as potassium and sodium. These materials may be incorporated either in their intended state of use or by way of a precursor material that undergoes transformation to the intended state during pre-processing or during operation. Transformation during pre-processing or during operation may be as a result of the elevated thermal conditions in use of a fuel cell, and suitable precursor materials include, for example, nitrates, acetates, citrates, oxalates or other salts of the base material or combinations thereof. Pre-processing is usually effected by calcination at elevated temperatures.

The proportion of the component for alleviating carbon deposition in the hydrocarbon reforming layer is preferably in the range 1-60 wt. %. Less of the component may not provide adequate protection against carbon deposition, while more of the component may mean there is insufficient catalyst in the hydrocarbon reforming layer.

Preferably, the catalyst is nickel. Nickel is a well known catalyst for the hydrocarbon steam reforming reaction and is particularly suited if the traditional nickel-zirconia cermet material is used for the anode layer. Other possible catalytic materials include any of the Group Vm elements of the periodic table such as cobalt, iron, rhodium, ruthenium, etc. and any combinations thereof, or with nickel.

Advantageously, the amount of nickel in the hydrocarbon reforming layer is at least 30 vol. % (approximately 40 wt. %). At this level, while acting as the catalyst, the nickel also provides adequate electronic conductivity through the hydrocarbon reforming layer if the layer overlies the anode layer. It may also be adapted at or above this minimum level to pass current from the fuel cell to an electrical interconnect or conductive gas separator plate. Alternatively, the electronic conductivity through and/or from the overlying hydrocarbon reforming layer may be achieved by other means such as a separate conductor, at least in part, in which case much less of a conductive catalyst such as nickel. The minimum proportion of catalyst in the hydrocarbon reforming layer is 0.1 wt. %.

Preferably, the composition of the hydrocarbon reforming layer is a nickel-zirconia cermet including the component, or precursor of such a component, for alleviating carbon deposition. However, if the component is present at the upper level of its range it may replace all of the zirconia in the reforming layer.

Preferably, the minimum thickness of the hydrocarbon reforming layer is 5 μm. While there is no theoretical upper limit to the thickness, practical considerations including mass transport limitations limit the height of the fuel cell and the mass of the hydrocarbon reforming layer may limit the reforming layer to 100 μm for an electrolyte or cathode layer-supported fuel cell and to 2000 μm for an anode layer-supported fuel cell. By electrolyte or cathode layer-supported and anode layer-supported fuel cell, we mean that the particular layer provides the structural support for the other layers of the fuel cell. More preferably, the mean thickness of the reforming layer is from 20 to 100 μm for an electrolyte or cathode layer-supported fuel cell, and from 300 to 500 μm for an anode layer-supported fuel cell. Below the lower limits of these ranges there may be excessive and unacceptable losses in lateral conductivity in case of cathode- or electrolyte-supported technology or insufficient structural support in case of anode-supported technology. Above the upper limits of the ranges mass transport limitations are likely to cause operational problems and increased power losses.

As noted above, the hydrocarbon reforming layer should have a microstructure which facilitates the fuel-stream mixture reaching the catalytically active sites of the layer. Preferably, the layer has a porosity of from 20 to 70 %, more preferably from 30 to 50%. The mean pore diameter may be from, for example, 0.1 to 20 μm, and is more preferably from 1 to 10 μm. Whilst these ranges relate to the mean pore diameter, it will be appreciated that the maximum pore diameter observed in the hydrocarbon reforming layer is less than the minimum thickness of that layer at any point. Otherwise, it is possible that pores in the layer would appear as holes extending through the thickness of the layer. In practice, the maximum pore diameter is usually controlled to be of an order of magnitude less than the minimum thickness of the reforming layer. The same applies to the anode layer and its porosity.

The anode layer, or electrochemical functional layer on the anode side, is preferably formed of the traditional Ni—$ZrO_2$ cermet anode material used for solid oxide fuel cells. However, other materials have been proposed and are not excluded from the invention. In a nickel zirconia cermet, the zirconia may be yttria stabilized ("YSZ"), for example at a level of from 3 to 10 wt. % yttria. In a nickel zirconia cermet, the zirconia or YSZ is preferably present in the range 20 to 80 wt. %, more preferably 30 to 70 wt. %. By way of example only, possible compositions for the anode electrochemical layer are a) 65 wt % NiO, 35 wt % YSZ and b) 54 wt % NiO, 46 wt % YSZ (prior to reduction of the NiO to Ni).

The thickness of the anode layer is set at a lower limit by the material chosen for the anode layer. In the case of a nickel zirconia cermet, this would be the particle sizes chosen for the nickel and zirconia or YSZ. However, the anode layer should be thicker than the reaction zone adjacent the electrolyte layer in which most of the oxidation of fuel occurs. The ratio of the zirconia or YSZ to the nickel in a nickel zirconia cermet and the degree of connection between nickel particles (for electronic conductivity), between zirconia particles (for ionic conductivity) and between nickel, zirconia and pore (for triple phase points) will influence the extent of the reaction zone. The degree of connection can be measured directly by qualitative or quantitative microscopy or indirectly by electrochemical performance testing.

At the upper level, gas diffusion and practical considerations such as the overall height of the fuel cell set the thickness of the anode layer. The minimum thickness for the anode layer is preferably about 1 to 2 nanometers, set by the particle size of the largest phase, and the maximum thickness for an electrolyte-supported anode layer is typically about 50 μm. The mean thickness for an electrolyte-, cathode- or anode-supported anode layer is preferably from 5 to 30 μm.

The porosity of the anode layer may be from, for example, 7 to 50% to enable the addition and removal of gases (particularly limited at the lower level by the ability to remove steam molecules). Preferably, the porosity of the anode layer is from 20 to 40 %, with the lesser upper level tending to maximize the triple-phase boundary length, that is the interface of the anode and electrolyte at which the fuel gas can react It will be appreciated that the porosity (in terms of percentage and pore size) of the anode and hydrocarbon reforming layers satisfies the relationship discussed above in order that the function of each layer is optimised.

In practice, attempts to produce anode and hydrocarbon reforming layers of uniform thickness will result in layers which have variations in thickness. Hence, the mean thickness of these layers is referred to above. It may in fact be desirable to control formation of the layers such that they have a deliberate gradation in thickness across the layer surface, i.e. the layer may be wedge-shaped in cross-section. This can be beneficial in terms of achieving uniform reactivity over the entire layer surface given the directionality of fuel stream flow across the layer surface. What is meant by this may be understood by reference to the heat effects observed when steam reforming takes place at the hydrocarbon reforming layer.

Steam reforming on the hydrocarbon reforming layer is an endothermic reaction and the potential for reaction at the leading edge of the layer (that edge which comes into contact with the fuel stream first) will exceed that of the downstream portions of the layer, such as at the trailing edge, due to concentration effects of reactive species in the fuel stream or due to high reactivity of the hydrocarbon reforming layer. This means that, if the actual reactivity of the layer is uniform, there may be localised chilling at the leading edge relative to other portions of the layer surface. From heat transfer and heat management perspectives it would be desirable that any chilling due to the reforming reaction be balanced with heat generation from the fuel cell reaction (i.e. electrochemical oxidation of hydrogen) over the entire surface of the two layers. This can be achieved by distributing the actual reactivity of the layer across the layer in the direction of fuel stream flow. Varying the actual reactivity of the layer in this way enables the concentration gradient across the layer with respect to reactive species in the fuel stream to be taken into account, thereby minimising any localised chilling due to the endothermic reforming reaction or localised heating due to the exothermic fuel cell reaction. One way of controlling the reactivity of the reforming layer is to control the thickness of the layer in the direction of the fuel stream flow over it. This may be achieved as part of the process by which the layer is formed. Other factors effecting reactivity of the layer include porosity and composition, and these characteristics of the layer may also be manipulated to achieve the desired result. Similar considerations apply in relation to the anode layer.

A typical solid oxide electrolyte material used in an SOFC is YSZ, with the yttria at a level preferably in the range 3 to 10 wt. %. However, many other materials have been proposed and the invention is applicable to all of these. Likewise, a variety of different cathode materials have been proposed at the air side of a SOFC and the invention is applicable to all of these. Preferably the cathode layer comprises strontium doped lanthanum manganite (LSM or $LanO_3$), strontium doped praseodymium manganite (PSM) or strontium doped lanthanum cobaltite (LSCO). The electrolyte layer must be impermeable to gas and have the required conductivity and preferably has a thickness in the range 50 to 200 µm, more preferably 70 to 150 µm. On the other hand, the cathode layer must be porous and may have a thickness in the range 20 to 100 µm, more preferably 40 to 70 µm. Both the electrolyte layer and the cathode layer may be in accordance with the prior art.

A porous conductive layer may be provided over the hydrocarbon reforming layer if it overlies the anode layer, or over the anode layer if the hydrocarbon reforming layer is separate to the anode layer. Such a conductive layer is adapted to pass current from the fuel cell to an electrical interconnect or conductive gas separator plate, and this may alternatively be achieved by a separate component. The conductive overlayer may be formed of such materials as nickel, iron, cobalt, tungsten, molybdenum, their carbides and any combination thereof, with or without other materials. The conductive overlayer may have thickness up to 500 µm, but preferably has a mean thickness in the range 30 to 100 µm. Its porosity should not be less than the layer or layers that it overlies. Alternatively, an overlying hydrocarbon reforming layer may be a combined hydrocarbon reforming and conductive layer, as previously described herein.

The present invention also provides a method of manufacturing a solid oxide fuel cell, as described herein, which method comprises providing a solid oxide fuel cell precursor comprising a solid oxide electrolyte layer, a cathode layer on a cathode side of the electrolyte layer and an anode on the anode side of the electrolyte layer, and disposing a hydrocarbon reforming layer on the anode side of the electrolyte layer, said hydrocarbon reforming layer having a composition different from that of the anode layer and comprising a catalyst for promoting a hydrocarbon steam reforming reaction and a component, or a precursor of such a component, for alleviating carbon deposition on the hydrocarbon reforming layer.

To be functional the oxidation state of the reforming catalyst in the hydrocarbon reforming layer should be carefully controlled. For instance, if nickel is used in its metallic state, it should be preserved in the metal state by maintaining a reducing environment in all manufacturing steps where the metal is heated to or above the oxidation temperature of nickel. On the other hand, if nickel is added in the oxide form, manufacturing steps at elevated temperatures will generally be carried out in air and the nickel oxide reduced to metallic nickel in manufacturing or this step may be carried out in situ prior to operation of the fuel-cell stack. Similar considerations may apply to the catalyst component in the anode layer. This is illustrated below.

The solid oxide fuel cell precursor mentioned above may be made by the application or adaptation of known techniques and one skilled in the art would have no difficulty in doing this. Manufacture of the precursor itself will obviously vary depending upon whether the solid oxide fuel cell is of the electrolyte-, cathode- or anode-layer supported type.

The manufacture of an electrolyte supported multilayer SOFC according to the present invention may be carried out using the following steps.

1. The individual components of the relevant layer (anode or hydrocarbon reforming layer) are usually available in powder form. The powders are processed to desired characteristics, for example to achieve the required particle size distribution. This may be done by milling or coarsening, or both, as appropriate
2. The processed powders are then blended with solvents, binders and pore-formers in controlled ratios to form a homogeneous ink with desired rheology.
3. The ink is deposited onto a substrate (see below), typically by screen-printing. The thickness of the ink layer is controlled by appropriate process variables (e.g. screen mesh size, squeegee type, ink rheology etc. for screen printing). Other methods of depositing the ink may be used.
4. The deposited ink layer is then dried in a controlled manner in order to maintain coherence and prevent excessive stress/shrinkage.
5. The layer is then fired under controlled conditions in order to achieve the desired microstructure. This firing takes place at a temperature sufficiently high to burn off the solvents, binders and pore-formers and to effect sintering of the components into a consolidated network. Firing is controlled so as to avoid over-densification and too much stress being imparted on the supporting substrate.

6. Depending upon the starting materials and conditions under which step 5 is carried out, the layer may be subjected to a reducing atmosphere to ensure active catalyst components are present in a suitable oxidation state. For instance, if Ni or NiO is used as one of the component powders and firing takes place in an oxidising environment, a final reduction to convert NiO to Ni will be required. This may be carried out as part of the manufacturing step or in situ in the fuel cell stack. Alternatively, if Ni is used as one of the component powders and the firing step is carried out in a reducing environment, no final reduction step should be necessary if the nickel is preserved in its metallic state up to the point of use/operation in a fuel cell (stack). Alternatively, nickel in the anode may be passivated and then re-reduced in the fuel cell (stack). Those skilled in the art will understand that passivation means preserving the metallic state in the bulk of the material by mild surface oxidation so that it can be exposed to an oxidising environment at ambient temperatures and the passive oxide layer can then be removed under a reducing atmosphere prior to use of the material.

When these steps are used to provide an anode layer, the substrate in step 3 is an electrolyte layer. For the reforming layer, the substrate referred to in step 3 is an electrolyte with an electrochemical functional or anode layer already deposited thereon. The electrochemical functional or anode layer may be either fired (but not reduced) or left dry to enable co-firing with the reforming layer. In other words, the reforming layer is either co-fired with the anode layer or the two layers are fired separately. One or more additional layers may be provided in similar fashion.

If the fuel cell has additional gas distribution and/or current collector layers, such as the conductive layer mentioned above, the anode and reforming layers may be co-fired with these layers.

Those skilled in the art will understand the interaction/effect of process variables (screen-printing, drying, firing and reduction) on the layers to control geometry (thickness and shape), microstructure, manufacturability and performance.

There are two approaches to adding the reforming layer additive for carbon deposition resistance. In one approach, the additive is added in oxide form during step 1 or 2. In the other approach, a precursor of the additive (usually a salt solution) is added and fired (calcined) between steps 5 and 6.

EXAMPLES

The present invention will be described further by reference to the following examples which are given for illustrative purposes only and should not be considered as limiting the invention.

Example 1

The following table illustrates the composition of a reforming layer, i.e. the composition with Ni in its metallic state. The composition is given by way of example only. It will be appreciated that this composition may be obtained by blending NiO with the YSZ and the additive oxide and then reducing the NiO to Ni during manufacturing or in the fuel cell stack or it may be obtained by combining Ni with the 1OYSZ and the additive oxide.

| Component/wt % | Example No. | | | | | | | | | |
|---|---|---|---|---|---|---|---|---|---|---|
| | 1 | 2 | 3 | 5 | 6 | 7 | 8 | 9 | 10 | 11 |
| Ni | 58.0 | 50.3 | 56.1 | 58.4 | 59.3 | 59.1 | 59.3 | 77.1 | 59.2 | 57.4 |
| YSZ | 39.7 | 43.9 | 38.4 | 30.2 | 23.2 | 39.4 | 40.5 | 16.4 | 37.1 | 23.7 |
| $WO_3$ | 2.3 | | | | | | | | | |
| $MoO_3$ | | 5.8 | | | | | 0.2 | | | |
| $CeO_2$ | | | | 11.4 | | 1.5 | | 6.5 | | 11.7 |
| MgO | | | 5.5 | | | | | | | |
| $Pr_6O_{11}$ | | | | | 17.5 | | | | | |
| $La_2O_3$ | | | | | | | | | 3.7 | 7.2 |

The following examples, which are given by way of illustration only describe incorporating the component needed for carbon deposition resistance by use of an appropriate precursor salt solution followed by calcination to obtain the oxide.

Example 2

NiO: 19.9g
YSZ: 8.1 g
Ammonium Cerium Nitrate (as a precursor for Cerium Oxide): 9.74g The resultant structure after reduction of NiO to Ni has the following composition, shown as weight percent:
Ni: 58.3%
YSZ: 30.3 %
$CeO_2$: 11.4%

Example 3

NiO: 65.0 g
YSZ: 35.0 g
Cerium Nitrate (as a precursor for Cerium oxide): 28.4 g The resultant structure after reduction of NiO to Ni has the following composition:
Ni: 50.54 %
YSZ: 34.62 %
$CeO_2$: 14.84 %

It will be appreciated that this approach may also be applied when Ni is used as starting material instead of NiO. The precursor salt may be added at one or more steps of the manufacturing process. For example, it may be added at the powder stage, at the component slurry stage, the reforming layer slurry stage, dried coating stage, fired coating stage, etc.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A solid oxide fuel cell comprising a solid oxide electrolyte layer, a cathode layer on a cathode side of the electrolyte layer and an anode layer on an anode side of the electrolyte layer, and wherein a hydrocarbon reforming layer is also disposed on the anode side of the electrolyte layer, wherein said hydrocarbon reforming layer: (a) has a composition different from that of the anode layer; (b) is a nickel-zirconia cermet in which the zirconia is yttrium stabilized zirconia; and (c) comprises a catalyst for promoting a hydrocarbon steam reforming reaction and a component, or a precursor of such a component, for alleviating carbon deposition on the hydrocarbon reforming layer.

2. A fuel cell according to claim 1, wherein the hydrocarbon reforming layer overlies the anode layer so as to at least partially cover the anode layer.

3. A fuel cell according to claim 1, wherein the hydrocarbon reforming layer is provided as a separate layer on the anode side of the electrolyte, in one or more parts.

4. A fuel cell according to claim 1 or 2, wherein the hydrocarbon reforming layer entirely covers the anode layer.

5. A fuel cell according to claim 1, wherein the hydrocarbon reforming layer is provided upstream of the anode layer, relative to the fuel stream flow to the fuel cell, so as to ensure that substantially all of the hydrocarbons in the fuel stream are steam reformed before the fuel stream contacts the anode layer.

6. A fuel cell according to any one of claims 1 to 3, wherein the component for alleviating carbon deposition is selected from cerium oxide, praseodymium oxide, lanthanum oxide, samarium oxide, tungsten oxide, molybdenum oxide, alkaline earth based materials oxide, and alkali based materials, and precursors thereof.

7. A fuel cell according to any one of claims 1 to 3, wherein the proportion of the component for alleviating carbon deposition in the hydrocarbon reforming layer is in the range of 1-60 wt. %.

8. A fuel cell according to any one of claims 1 to 3, wherein the hydrocarbon reforming layer contains nickel in an amount of at least 30 vol. % (approximately 40 wt. %).

9. A fuel cell according to any one of claims 1 to 3, wherein the mean thickness of the hydrocarbon reforming layer is from 20 to 100 μm for an electrolyte or cathode layer-supported fuel cell, and from 300 to 500 μm for an anode layer-supported fuel cell.

10. A fuel cell according to any one of claims 1 to 3, wherein the hydrocarbon reforming layer has a porosity of from 20 to 70 %.

11. A fuel cell according to any one of claims 1 to 3; wherein the anode layer has a porosity of from 7 to 50%.

12. A fuel cell according to claim 1, wherein the hydrocarbon reforming layer overlies the anode layer and a porous conductive layer is provided over the hydrocarbon reforming layer.

13. A fuel cell according to claim 1, wherein the hydrocarbon reforming layer is separate to the anode layer and a porous conductive layer is provided over the anode layer.

14. A method of manufacturing a solid oxide fuel cell, which method comprises providing a solid oxide fuel cell precursor comprising a solid oxide electrolyte layer, a cathode layer on a cathode side of the electrolyte layer and an anode on the anode side of the electrolyte layer, and disposing a hydrocarbon reforming layer on the anode side of the electrolyte layer, wherein said hydrocarbon reforming layer: (a) has a composition different from that of the anode layer; (b) is a nickel-zirconia cermet in which the zirconia is yttrium stabilized zirconia; and (c) comprises a catalyst for promoting a hydrocarbon steam reforming reaction and a component, or a precursor of such a component, for alleviating carbon deposition on the hydrocarbon reforming layer.

* * * * *